Aug. 19, 1941.  C. W. NIXON  2,253,194
MEANS FOR DIFFERENTIALLY SELECTING COINS, TOKENS, AND THE LIKE
Filed Feb. 11, 1939  7 Sheets-Sheet 1
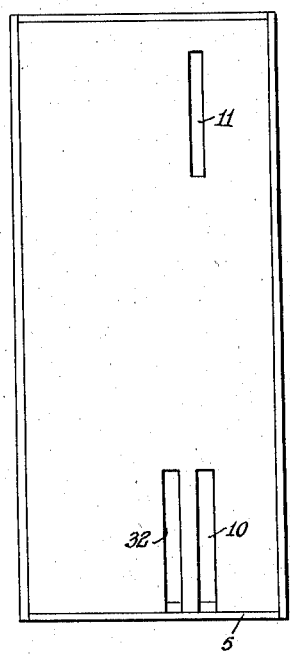
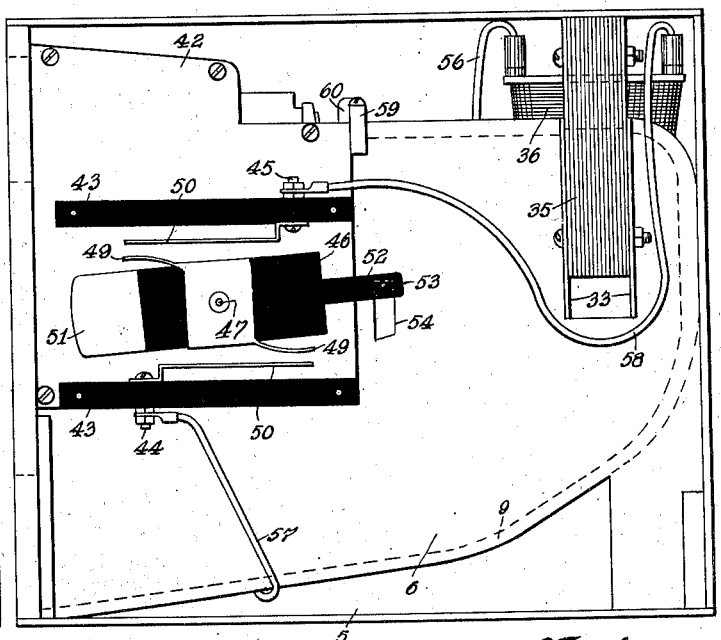
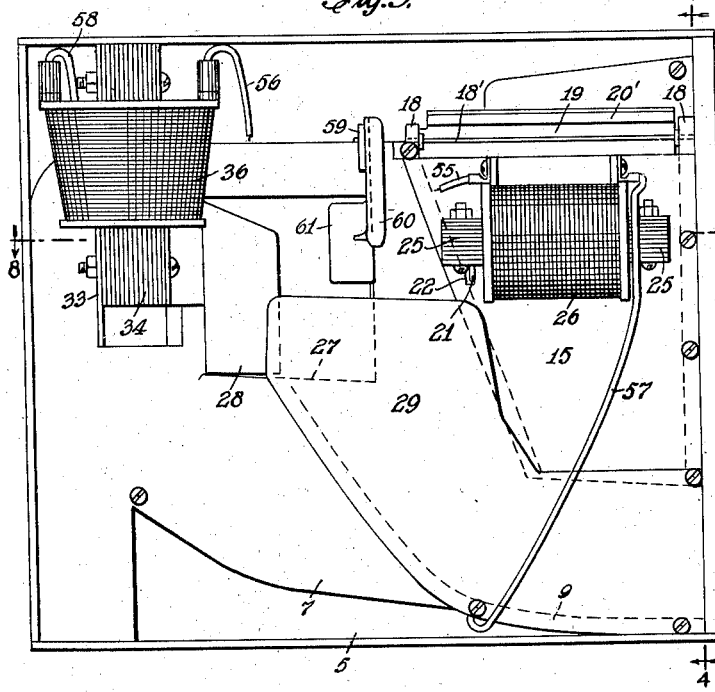
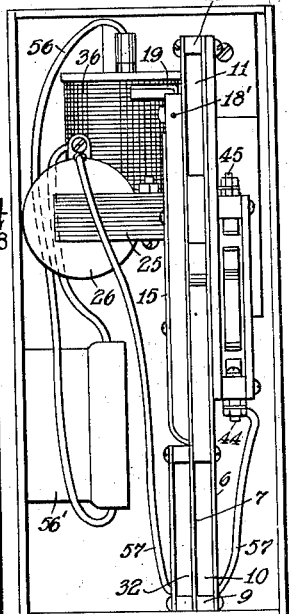
INVENTOR.
CLIFTON W. NIXON
BY M. C. Lyddane
ATTORNEY.

Aug. 19, 1941.　　　C. W. NIXON　　　2,253,194
MEANS FOR DIFFERENTIALLY SELECTING COINS, TOKENS, AND THE LIKE
Filed Feb. 11, 1939　　7 Sheets-Sheet 2
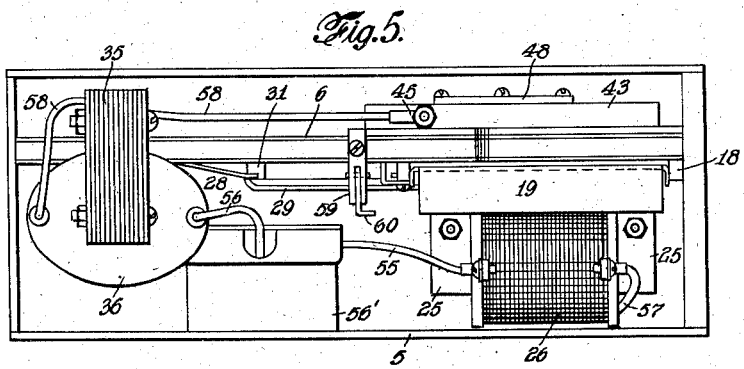
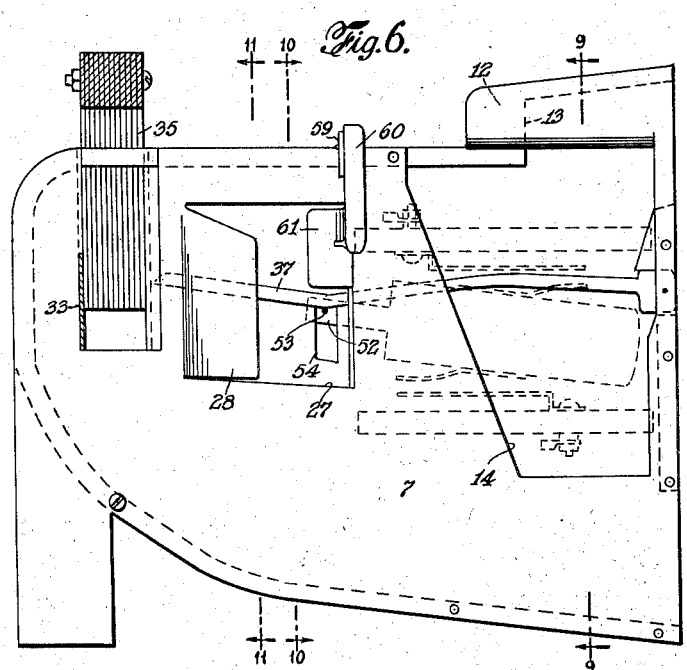
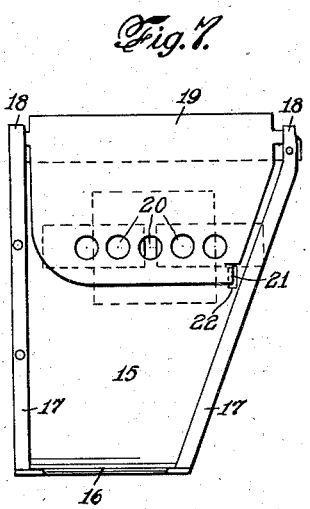
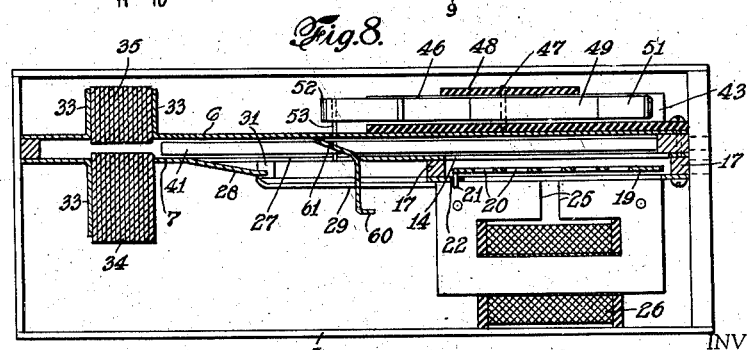
INVENTOR.
CLIFTON W. NIXON
BY
ATTORNEY.

Aug. 19, 1941.  C. W. NIXON  2,253,194
MEANS FOR DIFFERENTIALLY SELECTING COINS, TOKENS, AND THE LIKE
Filed Feb. 11, 1939  7 Sheets-Sheet 3
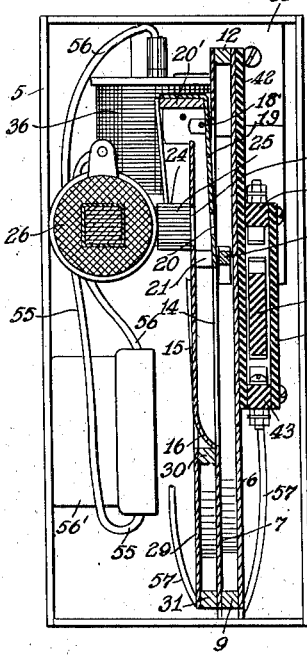
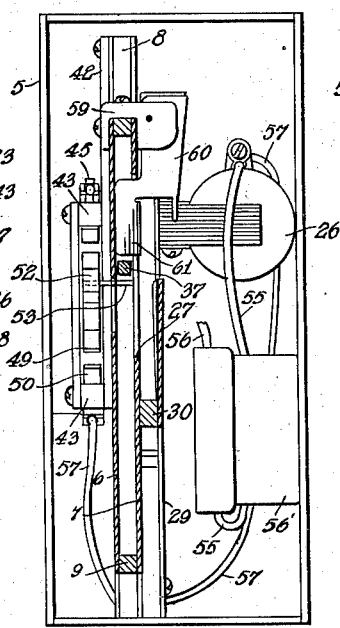
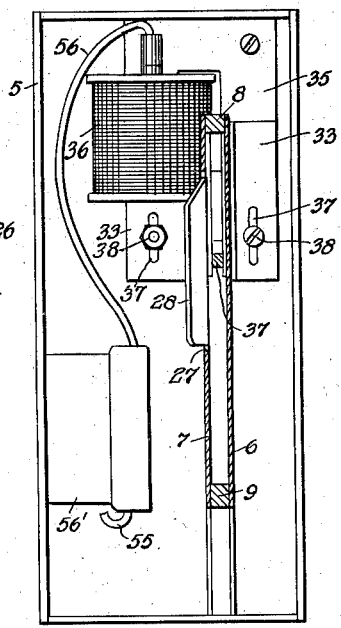
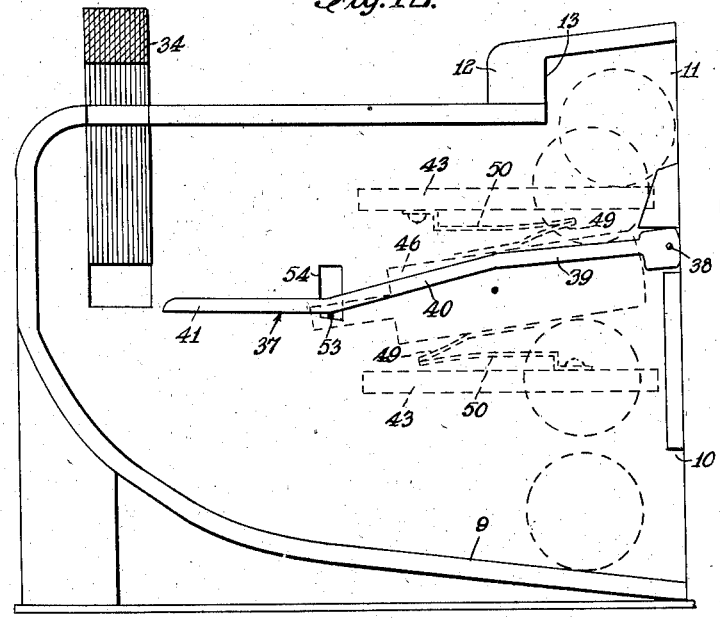
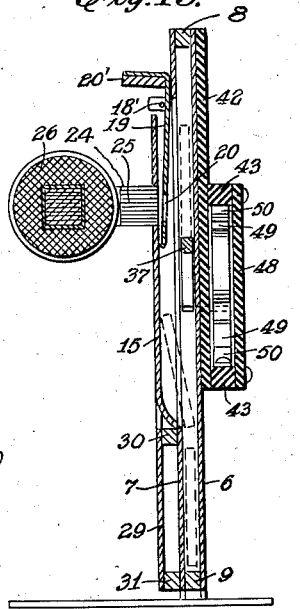
INVENTOR.
CLIFTON W. NIXON
BY
ATTORNEY.

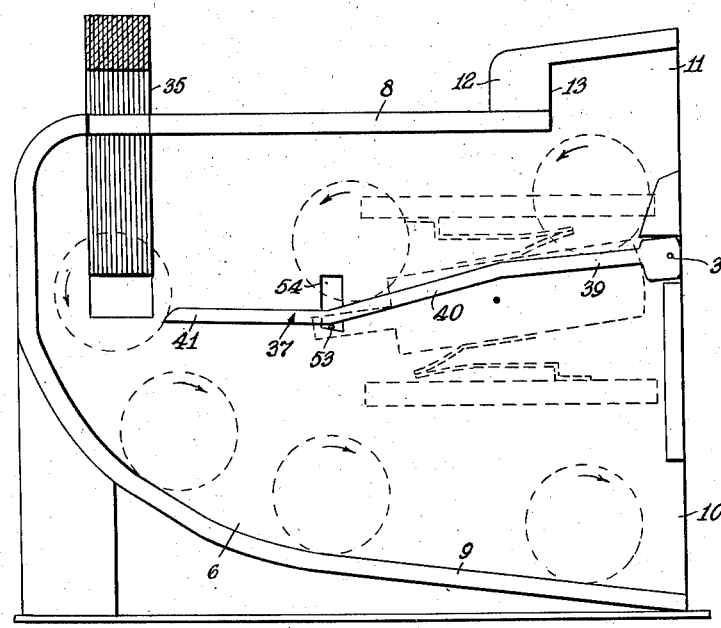
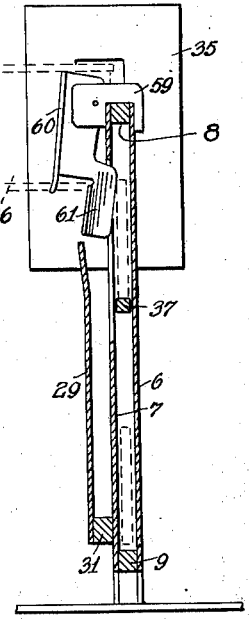
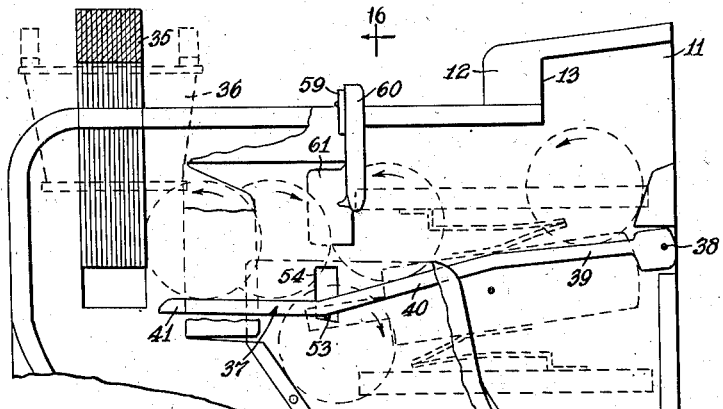
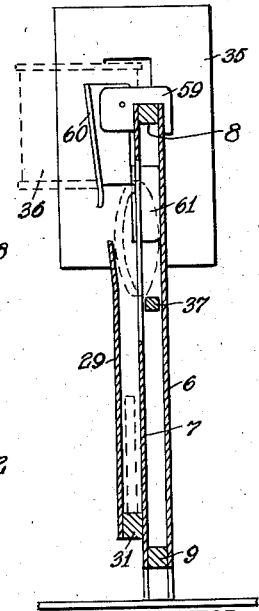
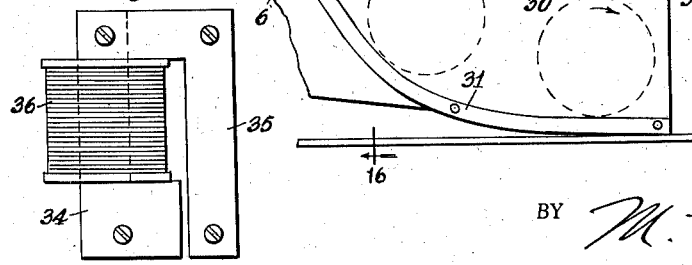

Aug. 19, 1941.   C. W. NIXON   2,253,194
MEANS FOR DIFFERENTIALLY SELECTING COINS, TOKENS, AND THE LIKE
Filed Feb. 11, 1939   7 Sheets-Sheet 5
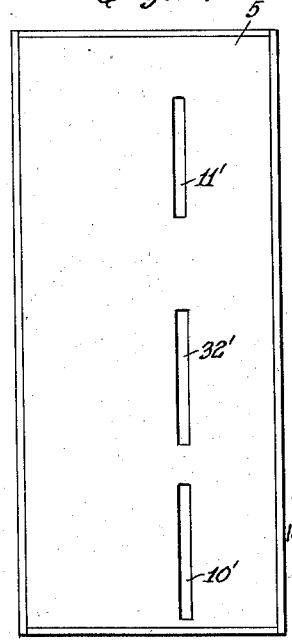
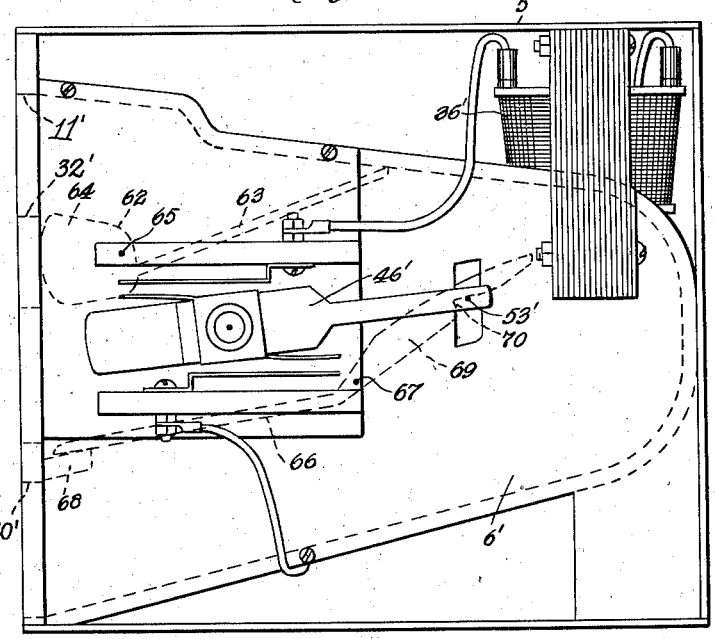
INVENTOR.
CLIFTON W. NIXON
BY *M. C. Lyddane*
ATTORNEY.

INVENTOR.
CLIFTON W. NIXON
BY
ATTORNEY.

Aug. 19, 1941.   C. W. NIXON   2,253,194
MEANS FOR DIFFERENTIALLY SELECTING COINS, TOKENS, AND THE LIKE
Filed Feb. 11, 1939   7 Sheets-Sheet 7

INVENTOR.
CLIFTON W. NIXON
BY M. E. Lyddane
ATTORNEY.

Patented Aug. 19, 1941

2,253,194

UNITED STATES PATENT OFFICE 2,253,194

MEANS FOR DIFFERENTIALLY SELECTING COINS, TOKENS, AND THE LIKE

Clifton W. Nixon, New York, N. Y.

Application February 11, 1939, Serial No. 255,799

3 Claims. (Cl. 194—100)

This invention relates to means for differentially selecting coins, tokens or the like, and is primarily characterized by a fundamentally novel method of coin selection which may be exemplified in mechanical apparatus of comparatively simple form and incorporated in commodity vending or dispensing machines for the purpose of frustrating fraudulent operation thereof.

One of the important objects of the invention is to render such coin selecting device practically infallible in operation, and to this end, I provide means for interposing in the path of gravity movement of the coins or tokens a magnetic field which has a retarding or arresting influence upon coins or tokens of predetermined silver content, but which is substantially neutral to all other non-ferrous coins or tokens.

More particularly in a practical embodiment of my invention, a magnetic field is established across the coin pathway which acts to positively stop further gravity movement and then repel or cause a retrograde movement of a coin or token of predetermined silver content, while all other non-ferrous coins or tokens are not substantially retarded and move through said field of electromagnetic force. Preferably, and with particular regard to the use of my invention in coin or check controlled apparatus, I provide in spaced relation to said field of electro-magnetic force, and at the ingress end of the coin pathway, electro-magnetic means for removing from said pathway, slugs or tokens of steel, iron or other ferrous metal so as to prevent the same from approaching the zone of influence of the electro-magnetic field which differentiates between the legitimate and spurious non-ferrous metal coins or tokens.

It is a further object of the invention in one particular mechanical embodiment thereof, to provide an especially constructed high strength impermanent electro-magnet and a mounting and arrangement thereof together with a coin operated circuit closing switch, whereby upon the deposit of the coin or token, an electro-magnetic flux field of great intensity traversing the path of gravity movement of the coin is produced and which possesses the unique quality of stopping or arresting the movement of a coin of a predetermined denomination, of the particular silver metal alloy content used by the Government mint in the manufacture of such coin, while all other non-ferrous metal coins or tokens of different composition are immune to the influence of the magnetic flux field and continue their gravity movement without interruption through said field and are returned to the depositor. Further, the legitimate coin is positively repelled by the influence of the electro-magnetic field and means is provided for deflecting such repelled coin from the coin pathway and directing the same to a collection receptacle.

Another object of the invention in one embodiment thereof, is to provide an improved type of circuit closing switch with coin actuated means operating said switch to circuit closing position and which includes means forming a movable bottom for the coin pathway and operating to prevent opening movement of the switch until the deposited coin has moved out of the range of influence of the electro-magnetic field.

Another object of the invention is to provide an improved mounting and arrangement of the iron or steel magnet together with means whereby, under the influence of said magnet, the ferrous metal coin or token, at the ingress end of the coin pathway, is immediately removed from said movable switch operating member so that the energizing circuit for the series connected electro-magnets is immediately opened.

A further general object of the invention is to provide a very simple, inexpensive and compact arrangement of the several elements of the coin selecting mechanism so that they will function reliably and efficiently, reducing maintenance cost to a minimum, and enabling such mechanism to be installed in a minimum of space within the cabinet or casing of a vending machine.

With the above and other objects in view, the invention resides in the improved means for differentially selecting coins, tokens or the like, and in the form, construction and relative arrangement of the several mechanical and electrical parts, as will be hereinafter more fully described, illustrated in the accompanying drawings and subsequently incorporated in the subjoined claims.

In the drawings wherein I have illustrated several simple and practical mechanisms for accomplishing the purposes of the present invention, and in which similar reference characters designate corresponding parts throughout the several views:

Fig. 1 is an end elevation of the casing within which the operating parts of the mechanism are housed, Fig. 2 is a side elevation with the side wall of the casing removed, Fig. 3 is a similar view of the opposite side of the device, Fig. 4 is an end elevation as indicated by the line 4—4 on Fig. 3, Fig. 5 is a plan view with the top of the casing omitted, Fig. 6 is a side elevation similar to Fig. 3, the ferrous metal magnet, and certain of the parts being omitted, Fig. 7 is a detail elevation of the discharge chute for ferrous metal coins and the oscillating plate associated therewith, Fig. 8 is a horizontal sectional view taken substantially on the line 8—8 of Fig. 3, Fig. 9 is a vertical section taken on the line 9—9 of Fig. 6, Fig. 10 is a similar section taken on the line 10—10 of Fig. 6, Fig. 11 is a similar vertical sectional view taken on the line 11—11 of Fig. 6, Fig. 12 is an elevation similar to Fig. 3, showing in dotted lines the successive positions of a ferrous metal coin between its insertion and return to the depositor, Fig. 13 is a vertical section similar to Fig. 9, showing the perforated oscillating plate through which the magnetic flux acts upon the coin or token and said plate thereby positioned so that after the circuit is opened and said coin released, it is discharged and directed into the coin return passage, Fig. 14 is a view similar to Fig. 12, illustrating in dotted lines the successive positions of a spurious non-ferrous metal coin or token between the points of insertion and its return to the depositor, Fig. 15 is a similar view showing in broken lines the successive positions of a legitimate ferrous metal coin or token of predetermined silver metal alloy between the point of its insertion and its discharge to the collection receptacle.

Fig. 16 is a vertical sectional view taken on the line 16—16 of Fig. 15, showing the coin deflecting gate as it is moved for normal position by the approach of the inserted coin into the zone of influence of the electro-magnetic field, Fig. 17 is a similar vertical sectional view showing the position of the gate after it has been engaged by the repelled coin, and whereby said coin is deflected from the coin pathway into the discharge passage leading to a coin collection receptacle, Fig. 18 is a detail elevation of the silver alloy magnet and its pole pieces, Fig. 19 is an end elevation of the case or housing for an alternative embodiment of the selecting mechanism, Fig. 20 is a side elevation of said alternative form of mechanism.

Fig. 21 is a similar view of the opposite side thereof,

Fig. 22 is an end elevation of said mechanism,

Figure 23:
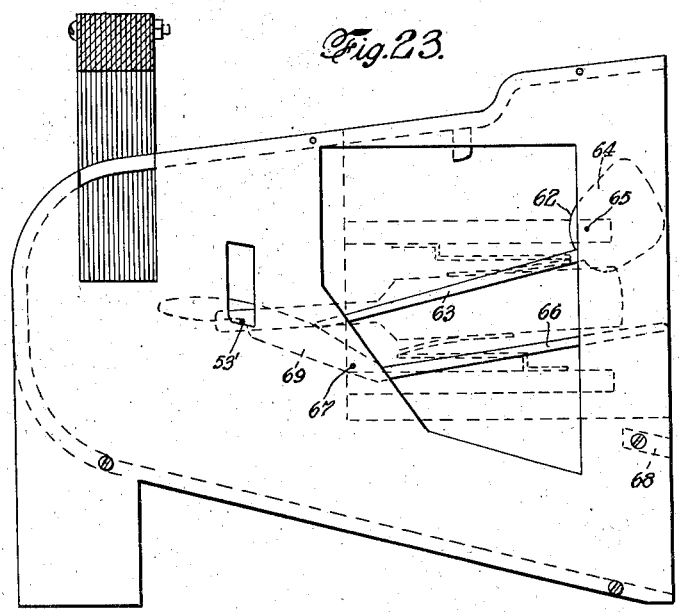
Figure 24:
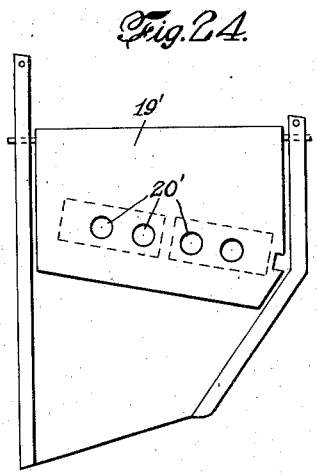
Figure 25:
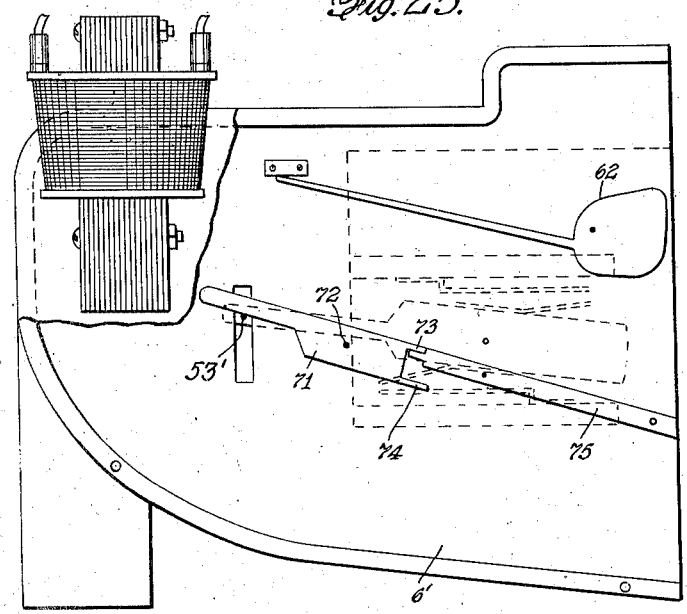
Figure 26:
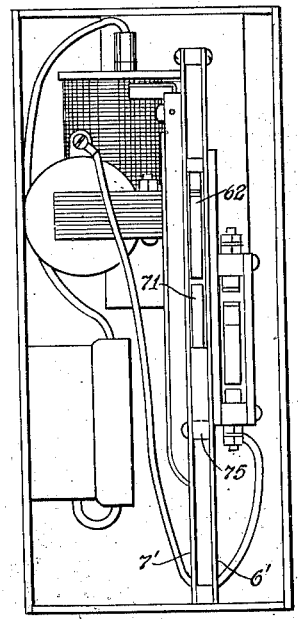
Figure 27:
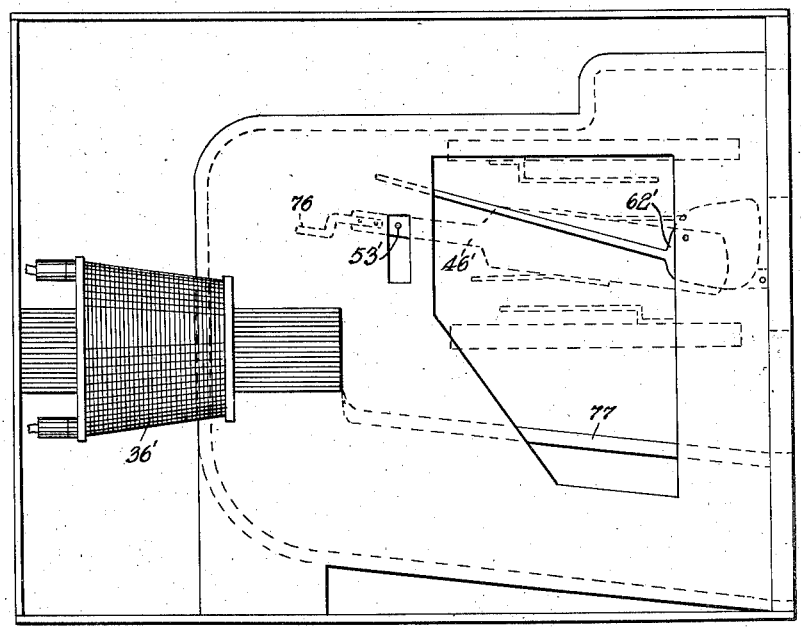
Figure 28:
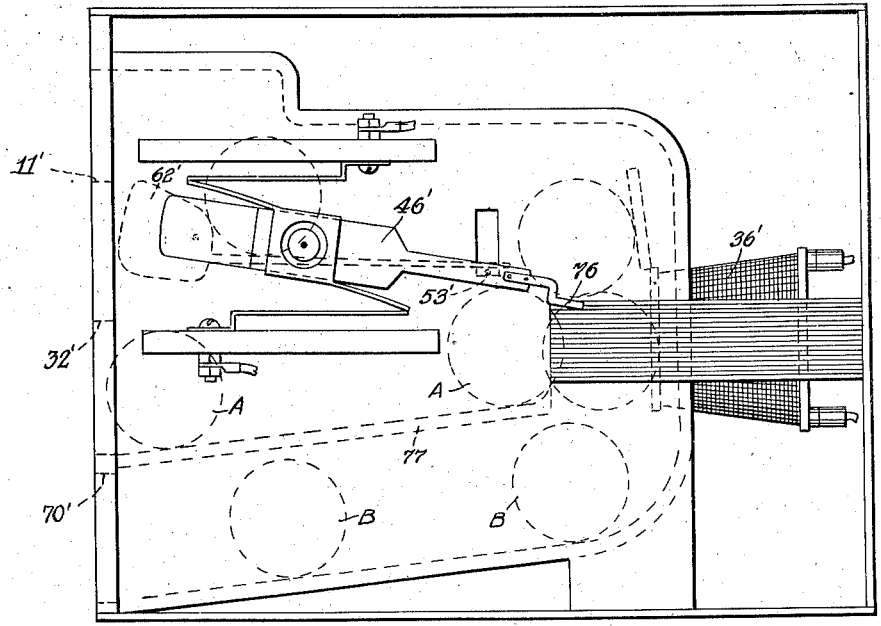

Fig. 23 is a view similar to Fig. 21 with certain of the parts omitted and showing the switch in circuit closing position, Fig. 24 is a detail elevation of the device for removing ferrous metal slugs or tokens, Fig. 25 is a side elevation illustrating a further modified form of the device, Fig. 26 is an end elevation thereof, Fig. 27 is a side elevation illustrating another modified construction and showing the switch operating means in normal position, and, Fig. 28 is a side elevation of the latter construction showing the switch in circuit closing position.

Referring in detail to the drawings, and, for the present more particularly to the embodiment of the invention illustrated in Figs. 1 to 18 thereof, the parts of the coin selecting mechanism are mounted within a suitable case or housing 5, the several walls or panels of which are preferably of Bakelite or other non-conducting and non-magnetizable material. As herein shown there is suitably mounted within the housing 5 and extending between the opposite end walls thereof vertically disposed spaced apart metal plates 6 and 7 respectively, rigidly connected together by spacing bars indicated at 8 and 9, the latter spacing bar being arranged between the lower edges of said plates and longitudinally inclined to direct spurious coins or tokens falling downwardly between said spaced plates to the return outlet opening 10 provided in one end wall or panel of the housing 5. Above and in vertical alignment with this opening 10, said panel is provided with the coin insertion opening 11. Adjacent to this opening, the plates 6 and 7 are formed with upwardly extending portions between which the metal spacing member 12 is secured, said member being formed with a stop shoulder 13 by which the inserted coin, when forcibly projected through the opening 11 is immediately engaged to direct said coin vertically downward for a purpose which will be presently explained.

Below the member 12, the plate 7 is provided with an opening 14 (Fig. 9) and to the outer side of said plate and suitably spaced therefrom the plate 15 is secured over said opening. This plate at its lower end is provided with an inwardly curved coin deflecting flange 16 which is adapted to direct coins or tokens through the opening 14 and downwardly between the plates 6 and 7.

The spacer bars 17 between the plates 7 and 15 are provided with upper terminal portions 18 (Fig. 7) extending above the plate 15, in which the ends of a pivot rod 18' are suitably fixed. Upon this pivot rod the oscillatable member 19 is pivotally mounted at its upper end, and extends downwardly between the plates 7 and 15. This member adjacent its lower edge is provided with a horizontally disposed series of spaced apertures 20 and at its upper end is formed with a laterally projecting flange to which a weight bar 20' (Fig. 13) is suitably attached. This bar normally holds the member 19 in the position shown in Fig. 9 of the drawings with the lower portion thereof disposed in the plane of plate 7 within the opening 14. The member 19 is also provided at its lower end with a lug 21 movable in an opening 22 in the plate 15 and which acts to limit the oscillatory motion of said member to the position shown in Fig. 13 of the drawings.

The plate 15 opposite the series of apertures 20 in the member 19 is provided with a horizontal slot or opening 23 formed by striking the flange 24 from said plate, said flange projecting laterally from the upper edge of the opening 23. To this flange and over the opening 23, the poles 25 of an electro-magnet 26 are rigidly attached. This magnet is of standard construction for the magnetization of steel, iron or other ferrous metals, and operates in the manner hereinafter explained, to immediately remove and discharge tokens or slugs of ferrous metal which may be inserted through the coin receiving slot 11.

In laterally spaced relation from the magnet 26 the plate 7 is provided with another opening 27 (Fig. 10) therein and at one vertical edge of this opening, an integral coin directing wing 28 (Fig. 11) is slightly offset outwardly from the plane of said plate to direct the good or legitimate coins into the space between said plate and the plate 29 which is spaced from the outer side face of the plate 7 by the spacing bars 30 and 31 and rigidly secured thereto in any suitable manner. The lower spacing bar 31 is in the horizontal plane of the bar 9 and longitudinally inclined to direct the coins through the slot 32 in the end wall or panel of the housing 5, from which they are received in or conveyed to a suitable collection receptacle.

Adjacent to the opening 27, each of the plates 6 and 7, is also provided with a vertically extending opening. Suitable flanges indicated at 33 (Fig. 8), are secured to each of said plates at the opposite vertical edges of the opening therein and between these flanges the pole pieces 34 and 35 of a second electro-magnet 36 are mounted. As shown in Fig. 11, for the purpose of permitting a vertical adjustment of the magnet poles and coil, I provide the flanges 33 with vertically extending slots 37 in which the securing bolts 38 for the pole pieces may be vertically adjusted. It will be evident that by reason of such mounting of the magnet pole pieces, the magnetic flux field, when the circuit is closed through the magnet coil, will traverse the path of gravity movement of the coins or tokens between the spaced plates 6 and 7.

The magnet coil 36 is of a special type so that the magnetic flux field is of such strength or intensity that it will influence only coins or tokens of a predetermined non-ferrous metal composition while all other non-ferrous coins or tokens will be immune to such influence. I have succeeded in producing this effect in the operation of the device by utilizing insulated wire of a particular gauge in the formation of the magnet coil. The strength of the magnetic flux field is of course, determined by the number of layers and the number of turns or convolutions in each layer of the coil. Therefore, for the selection of coins of different denominations which greatly differ in weight there will necessarily be a specific difference as to the gauge of the magnet coil wire and/or the number of layers of said wire and the convolutions in each layer. For instance, assuming that in the illustrated embodiment the magnet coil when energized produces a flux field of such strength as to select dimes and quarters, for the thicker and heavier half dollar, an electro-magnetic field of somewhat greater strength would be required. In such case also the magnet poles 34 and 35 would be relatively adjusted to slightly increase the width of the space or gap therebetween so as to accommodate the thicker coin. The strength of the magnet is also calculated with reference to the degree of inclination of the coin pathway and the upper and lower limits of coin weights, which determines the velocity of rolling movement of the coins.

The position of the flux field gap between the poles 34 and 35, to dispose the maximum concentration of magnetic influence relative to the approaching coin, may be varied by vertically adjusting the magnet as above explained. I have found that it is desirable for most effective operation that this point of maximum concentration of magnetic influence upon the coin should be located slightly above the coin center.

The coils 26 and 36 of the two electro-magnets are connected in series in an electrical current supply circuit, which circuit is automatically closed to simultaneously energize the magnets by an inserted coin or token as shown in Figs. 2, 3 and 4. In one embodiment of this coin actuated switch, I provide the lever member generally indicated at 37 (Figs. 6 and 12), which is fulcrumed at one of its ends, as at 38, between the spaced plates 6 and 7 and constitutes the pivotally movable floor of a coin guideway. This lever member comprises three sections 39, 40 and 41 disposed in angular relation to each other.

To the outer side face of the plate 6 a sheet of insulating material 42 is secured having vertically spaced bars 43 (Fig. 2) thereon in which the switch terminals 44 and 45 respectively are secured. Between these bars the oscillatable switch member 46 is mounted upon an axis 47 suitably fixed at its ends in the insulating sheet 42 and the spacer member 48 of insulating material which is secured at its opposite ends to the bars 43. The member 46 carries the upper and lower circuit closing contacts 49, which are preferably in the form of light resilient fingers projecting in opposite directions longitudinally of the member 46 and located on opposite sides of its axis 47. These yieldable contact members are adapted to respectively coact with similar yieldable metal contact strips 50 which are connected at one of their ends with the respective terminals 44 and 45. The contact fingers 49 are normally maintained in circuit breaking relation to the contact plates 50 by the weight 51 suitably secured to one end of the member 46. At its other end this switch member has an extension 52 which carries a pin 53 extending through a vertical slot 54 in the plate 6. As best shown in Fig. 6 of the drawings, this pin is in supporting contact with the pivoted lever member 37 substantially at the juncture of the parts 40 and 41 of said member. It will be understood that the members 37 and 46 are formed from very light weight materials so that while the weight 51 is sufficient to maintain member 46 in normal open circuit position, this weight is not sufficiently great to counter-balance coins which the device is designed to handle, however badly worn such coins may be. It will therefore be noted that, in the open position of the switch member, lever 37 is disposed with the section 39 thereof at its pivoted end extending at a slight upward inclination, while the intermediate section 40 inclines downwardly therefrom to the pin 53, and the other end section 41 of said lever is upwardly inclined and the terminal thereof positioned slightly above the flux field gap between the magnet poles 34 and 35 (Fig. 6).

One terminal of each of the magnet coils 26 and 36 is connected by wires 55 and 56 respectively to one of the contacts of a plug receiving socket 56′ which is suitably attached to the inner face of one of the side walls of the housing 5 and receives the circuit closing contact prongs of a conventional connecting plug (not shown) extending from a convenient source of electrical current supply. The other terminals of magnet coils 26 and 36 are connected by wires 57 and 58 respectively to the switch terminals 44 and 45 respectively.

Upon a lug 59 projecting transversely from the upper edge of the plate 7 a depending gate member 60 is pivotally mounted. This gate member includes a vertical arm of angular cross-sectional form, one flange of which is provided at the lower end of said arm with a laterally extending curved wing 61. Normally this wing of the gate member is disposed within the coin pathway, immediately above the pivoted lever 37 (Fig. 6) and with its free edge in contact with the plate 6 and in suitably spaced relation from the free vertical edge of the coin directing wing 28. In the operation of the above described device, upon insertion of a coin or token through the slot 11, it drops downwardly into the ingress end of the coin pathway and upon the section 39 of lever 37. Under the weight of the coin, said lever is depressed thus transmitting rocking or oscillating movement to switch member 46 and simultaneously closing an energizing circuit through electromagnet coils 26 and 36. The light yieldable circuit closing contacts 49 and 50 will have relative sliding engagement, thus maintaining clean, bright surfaces and good electrical conduction. While the coin remains in bearing contact upon lever 37, the circuit remains closed and the free end of said lever is then positioned at the lower end of the flux field gap between the magnet poles 34 and 35 as shown in Fig. 12 of the drawings. If the coin or token is of steel, iron or other ferrous metal, it is immediately attracted by the magnetic flux of the electro-magnet 26 operating through the apertures 20 in the pivoted member 19 and thus moving the coin or token transversely into contact with the face of said member 19 and also swinging said member to the position shown in Fig. 13 of the drawings. The coin or token is thus removed from the lever 37 which immediately returns to its normal position under the action of weight 51, and member 46 is also returned to its normal circuit breaking position. Upon thus deenergizing the electro-magnet, the coin is released and drops downwardly between the plates 7 and 15 and is transversely directed by the curved lower end 16 of the latter plate into the space between the plates 6 and 7, from which it is directed by the spacing member 9 outwardly through the slot 10.

If the inserted coin is of non-ferrous metal, it will be immune to the influence of electro-magnet 26 and will then roll by gravity upon the pivoted lever 37 while maintaining said lever in circuit closing position. As shown in Fig. 16, when the coin reaches the gate member 60, it contacts with the convex face of the gate-wing 61 and passes without resistance beyond said gate and upon end portion 41 of lever 37. As above stated, the magnetic flux field of the electro-magnet 36 is of such character that, when the non-ferrous coin comes within the zone of electrical influence of said field, if the coin is of the predetermined silver metal alloy content of the legal coin, its further gravity movement will first be stopped or arrested, and the coin will then be positively repelled or moved backwardly upon lever 37. When the coin in its backward or retrograde movement strikes the concave surface of the gate-wing 61 (Fig. 8), it will be transversely deflected from the lever 37 through the opening 27 in plate 7 and will be directed by the wing 28 on said plate into the passageway between said plate and the plate 29, as clearly illustrated in Figs. 15 and 17 of the drawings. The coin will then be directed by the spacing strip or bar 31 outwardly through the slot 32 from which it is received in a suitable collection receptacle.

In the event that the coin or token, though of non-ferrous metal, and therefore, immune to the influence of electro-magnet 26, is not of the silver metal alloy composition of the legitimate coin as minted by the government, its movement will not be reversed by the influence of the flux field of magnet 36, but it will then pass without appreciable interruption through said field between the magnet poles 34 and 35 and drop downwardly by gravity into the space between the plates 6 and 7 and also be directed by spacing member 9 outwardly through the return slot 10.

It will be evident from the above that the invention is fundamentally characterized by interposing in the path of gravity movement of the coins or tokens a magnetic field having a positive repellant influence upon legitimate coins of legally established silver alloy composition while all other non-ferrous coins or tokens are substantially immune to such influence. Therefore, since the successful operation of the device does not depend upon differences in weight, diameter or thickness, between the legitimate and spurious coins or tokens, even old and badly worn coins will be differentially selected from the spurious coins or tokens by the present invention. It will be understood from the foregoing that the electro-magnet 36 is especially constructed to provide a magnetic field of requisite strength so that eddy currents produced in the approaching non-ferrous legal coin of one definite composition, such as silver coins of the United States having a fineness within the legally established limits of .897 to .903, will react with said field and the direction of rolling movement of the legal coin will be reversed while other spurious non-ferrous coins, slugs or tokens will be substantially unretarded and roll continuously in one direction through the magnetic field. Thus the magnet 36 functions to selectively and finally differentiate between the legal and spurious coins independently of all considerations of relative differences in size, weight, resilience, or the momentum or velocity at which the rolling coin enters the zone of influence of the magnetic field.

Of course, if a slug or token of ferrous metal should come within the zone of influence of electro-magnet 36, it would be attracted and held thereby, thus clogging the coin pathway. This possibility, however, is obviated by the arrangement of the electro-magnet 26 at the ingress end of the coin pathway which, as above explained, immediately attracts and removes such ferrous metal slugs or tokens so that they will not obstruct the free passage of coins or tokens of non-ferrous metal along said pathway, to either be returned to the user, or directed into the coin collection receptacle, after passing through or being repelled by the magnetic flux field of electro-magnet 36.

In Figs. 19 to 24 inclusive, I illustrate another embodiment, in which the return opening 10' for the spurious coins or tokens, the coin insertion opening 11' and the opening 32' through which the legitimate coins pass to the collection receptacle are all arranged in vertical alignment in a panel or wall of the housing 5. In this construction, the same means is provided for removing the ferrous metal coins or tokens from the coin pathway and discharging the same through the opening 10'. The electro-magnet 26' however is mounted with its coil axis at a slight horizontal inclination and the line of apertures 20' in the pivoted member 19' is correspondingly inclined so that the magnetic flux field will be substantially parallel with the path of gravity movement of the coin. Also, in this case, the ferrous metal magnet 26' is somewhat more remote from the entrance slot 11' and closer to the silver alloy magnet 36'.

Between the spaced vertical plates 6' and 7' and above the circuit closing switch 46', which corresponds in construction to that above described, the coin actuated switch operating member 62 is arranged. This member includes an arm 63 terminating at one end in a relatively heavy enlargement 64 which is pivoted between the plates 6' and 7' as at 65. Pivotal movement of this member to its normal position (Figs. 20, 21) is limited by contact of the end of the arm 63 with the connecting and spacing strip 12' between the edges of said spaced plates. Below the circuit closing switch 46' a lever 66 is pivotally mounted intermediate of its ends between the plates 6' and 7' as at 67. Normally, when the switch is open one end of this lever is supported upon the inclined stop member 68 secured between said plates and in adjacent relation to the lower end of the slot 32' in the housing wall. The other end portion of this lever is relatively wide and extends at an upward inclination from the pivot 67 as shown at 69. The lower edge thereof is provided with a notch or recess having an inclined surface in sliding contact with the pin 53' carried by the oscillatory switch member 46'. A stop shoulder 70 at one end of said inclined surface for contact with pin 53' limits pivotal movement of the lever 66 from its normal position. The upper edge of the part 69 of said lever 66 is preferably longitudinally convex so that the end of the arm 63 will have smooth riding contact thereon (Fig. 23). In the normal position of the member 62, it will be noted from reference to Fig. 20 that the upper edge of its end portion 64 is disposed adjacent to the lower end of the coin insertion slot 11'.

In the operation of the above described form of my invention, it will be evident that when the coin or token is inserted through the slot 11', it first rolls over the end 64 and upon the arm 63 of member 62, whereupon said member is pivotally rocked and the arm moved downwardly and into contact with the part 69 of lever 66. Under the pressure of the rolling coin lever 66 is rocked upon its pivot 67, and by pressure on the pin 53' in turn oscillates switch member 46' to close the circuit and energize electro-magnets 26' and 36' as above explained. The parts are then in the position shown in Fig. 23 of the drawings with the end portion 69 of lever 66 extending upwardly at an inclination from the arm 63. Therefore, when the coin rolls off of arm 63 and upon the upwardly inclined edge of the lever end 69, member 62 will return by gravity movement of its weighted end 64 to normal position while the now slowly moving coin will maintain the switch member 46' in circuit closing position. As soon as the coin comes within the zone of influence of the flux field of electromagnet 36', it is then immediately repelled, if it is of the government standard silver alloy content, and moves backwardly and downwardly upon the part 69 of the lever end beyond its pivot 67. The lever will then return to its normal position thus rocking switch member 46' to open the magnet energizing circuit until the end of the lever again rests upon the support 68 in position to direct the rolling coin outwardly through the slot 32'. Of course, if the non-ferrous metal coin or token is not of the proper silver metal composition, it will pass through the field of magnet 36' and then gravitate downwardly between the spaced plates 6' and 7' and below lever 66 and be returned to the depositor through slot 10'.

In Figs. 25 and 26 I show a slight modification of the last described construction, in which instead of the lever 66, I may use the relatively short lever 71 pivoted intermediate of its ends as at 72. One end of this lever rests upon a transverse pin 53' carried by the oscillating switch member 46' while the other end thereof is recessed to provide vertically spaced lugs 73 and 74 respectively. These lugs are adapted to coact with one end of the fixed horizontally inclined spacing bar 75 secured between the spaced vertical plates 6' and 7' to limit the oscillating movement of said lever. When the lever 71 is operated by the coin actuated member 62 as above explained, the lower lug 74 contacts the end of bar 75 to limit such movement, while lug 73 limits return movement of the lever to normal position so that the upper edges of said bar and the lever 71 will be substantially in alignment to provide a continuous supporting surface for the rolling coin. The operation of this device, is otherwise the same as heretofore explained.

In Figs. 27 and 28 of the drawings a further alternative arrangement is illustrated, in which the end of the arm of the pivoted coin actuated member 62' directly engages the pin 53' of the oscillatory circuit closing switch member. The end of said switch member also carries a projecting steel pin or rod 76. Thus when the inserted coin contacts member 62' which in turn operates the switch member to close the circuit the steel rod 76 comes within the zone of attractive influence of the field of the silver alloy magnet 36'. Therefore after the coin rolls off of the arm of member 62' and the latter returns to normal position, magnetic attraction of the rod 76 tends to prevent opening movement of the switch and there will be a fluctuating movement of switch member 46', which will be of sufficient duration while maintaining the circuit closed through the resilient contact fingers 49 for the coin to be subjected to the repelling influence of the magnetic flux field. If the coin is of the proper predetermined silver content, it will thus be directed downwardly upon the inclined spacing bar 77, as shown at A, and outwardly through the slot 32'. All coins or tokens of other non-ferrous metal composition will pass through the field of magnet 36' and be discharged through the slot 10' as indicated at B.

The rod 76 carried by the pivoted switch member will finally move upwardly until the weighted end of said switch member overcomes the attractive pull of the magnetic field and returns said member to its normal position to open the circuit. Of course, it will be understood that in connection with this latter form of the invention the magnet 26 for iron or steel coins will also be used in the manner previously described.

From the above description considered in connection with the accompanying drawings it is believed that my improved means for differentially selecting coins or tokens, and the several examples of suitable mechanisms whereby the said method may be practically and efficiently carried out, will be clearly and fully understood. Essentially the present disclosure is distinguishable from the inventive efforts of others to provide a reliable and efficient coin selector for merchandizing or vending apparatus, in that I utilize a medium which has the peculiar capability of differentially selecting between non-ferrous metal coins or tokens subjected to the influence thereof, by repelling and reversing the gravity movement of that coin or token which has a certain predetermined silver metal alloy composition while permitting substantially unimpeded gravity movement of all other coins or tokens of different non-ferrous alloy composition, although in every other respect being substantially identical with a legitimate coin or token.

Of course it will be understood that in the several illustrated mechanical embodiments of my invention, after the legal coin has been selected and discharged by the action of the flux field of the silver alloy magnet, it first actuates means which controls the operation of article delivery mechanism, before it is finally deposited in the collection receptacle. In the several examples of the selecting mechanism all of the metal parts are preferably of brass or copper to reduce magnetization to a minimum, and I also provide terminal connections for the magnet coil windings of the conventional socket and pin type so that the lead wires may be readily disconnected and the magnets easily and quickly removed when necessary. It will further be noted that the several parts of the mechanism are very simple in construction and compactly mounted and arranged so that the unit as a whole will occupy relatively little space within the vending machine cabinet or case. Actual operation of the device has demonstrated that it functions in a reliable and efficient manner to accomplish the intended result. Also, the maintenance cost of a coin selecting device of this character will be negligible.

While I have herein disclosed several very practical structural forms of my present invention, it is nevertheless to be understood that the essential features thereof are also susceptible of embodiment in still further mechanical combinations of the several elements. It is accordingly to be understood that I reserve the privilege of resorting to all such legitimate changes in the form, construction and relative arrangement of the various parts as may fairly be comprehended within the spirit and scope of the appended claims.

I claim:

1. In combination with a structure having a coin pathway, an electro-magnet mounted adjacent to said pathway, constructed to produce within said pathway, when said magnet is energized, a magnetic field of such intensity that a legal non-ferrous coin approaching said field is responsively influenced and the movement of said coin first arrested and then positively reversed in said pathway, while spurious non-ferrous metal coins or tokens continuously move in one direction through the magnetic field.

2. In combination with a structure having a coin pathway, an electro-magnet mounted adjacent to said pathway, constructed to produce within said pathway, when said magnet is energized, a magnetic field of such intensity that a legal silver alloy coin approaching said field is responsively influenced and the movement of said coin first arrested and then positively reversed in said pathway, while spurious non-ferrous metal coins or tokens continuously move in one direction through the magnetic field.

3. In combination with a structure having a coin pathway, an electro-magnet mounted adjacent to said pathway, constructed to produce within said pathway, when said magnet is energized, a magnetic field of such intensity that a legal non-ferrous coin approaching said field is responsively influenced and the movement of said coin first arrested and then positively reversed in said pathway, while spurious non-ferrous metal coins or tokens continuously move in one direction through the magnetic field, and a movable member mounted between the ingress end of the pathway and the electro-magnet and having a part normally positioned across said pathway, said part being moved by the coins to non-obstructing position in the rolling movement of the coins toward the magnet but acting to deflect the reversely moving legal coins from said pathway.

CLIFTON W. NIXON.